Patented Sept. 2, 1952

2,609,351

UNITED STATES PATENT OFFICE 2,609,351

PROCESS FOR THE PREPARATION OF RAPIDLY HARDENING CAST RESINS FROM PHENOL AND FORMALDEHYDE AND TENSION-FREE CASTINGS PREPARED THEREFROM

Willem Johan Taat and Rudolf Willem van Hoesen Korndorffer, Delft, Netherlands, assignors to Nederlandse Organisatie voor Toegepast-Natuurwetenschappelijk Onderzoek, ten behoeve van Nijverheid, Handel en Verkeer, The Hague, Netherlands, a corporation of the Netherlands No Drawing. Application February 9, 1949, Serial No. 75,493. In the Netherlands March 25, 1948

15 Claims. (Cl. 260—44)

1

The present invention relates to a process for the preparation of rapidly hardening cast resins from phenol and formaldehyde, and to the tension-free, castings prepared from these cast resins. It is well known, that cast resins based upon phenol and formaldehyde give tension-free products upon slow and careful hardening. As such a slow hardening entails difficulties in practice, means to cause the hardening to proceed more quickly have been searched after. Thus it has been proposed to accelerate the hardening by working at higher temperatures and under increased pressure. In general, however, products which still show considerable tension, are obtained in this way. In order to eliminate these tensions substances, such as glycerol, have been added or the product was prepared in an inert atmosphere. The results thus obtained, however, did not show much improvement.

Also various acids, such as hydrochloric acid, chloro acetic acid and lactic acid, have been used as catalysts for accelerating the hardening of cast resins based upon phenol and formaldehyde. Cast resins provided with these catalysts, however, are not suitable for the production of castings, as after some time tears and ruptures appear in said objects and empty spaces are formed, even to such an extent, that articles of certain dimensions fall apart, in grains.

It has now been found, that rapidly hardening cast resins from phenol and formaldehyde, suitable for the production of tension-free castings, may be prepared using an acid catalyst, if maleic anhydride, as such or mixed with a polyvalent alcohol or a mixture of polyvalent alcohols, is added to the resins as a hardening accelerator.

The addition of maleic anhydride according to the present invention not only shortens the hardening time of the resins from phenol and formaldehyde to a considerable extent, but also permits the production of castings which are completely free from tension. The machinability of the castings is also very satisfactory. The outward appearance of the products cast from resins, to which, prior to casting, maleic anhydride has been added, is very beautiful.

If the maleic anhydride is first mixed with a polyvalent alcohol or with a mixture of polyvalent alcohols, the hardening time is somewhat lengthened, it is true, but there are obtained

2 castings having a particularly fine outward appearance and gas or froth development, which may occur in hardening castings from resins, to which maleic anhydride has been added as such, completely fails to appear. Also technical working up of mixtures of maleic anhydride and polyvalent alcohols in the resins gives less difficulties than working up the solid maleic anhydride. It has been found particularly advantageous to preheat the mixture of maleic anhydride and a polyvalent alcohol, or a mixture of polyvalent alcohols for some time, in such a way, however, that sufficient acid groups are still present in the mixture. Very good results were obtained, if glycerol was used as a polyvalent alcohol. Dependent upon the extent of acceleration of the hardening which it is desired to reach, or upon the desired colour or toughness of the hardened castings the amounts of maleic anhydride and polyvalent alcohol may vary. Good results were obtained using about 10% of maleic anhydride. In case a mixture of maleic anhydride and glycerol is added, preferably equal amounts by weight of these substances are used.

Example I 48 parts of phenol, 105 parts of 33% formaline, 25 parts of denatured 96% ethanol and 0.75 part of sodium hydroxide were mixed and heated for three quarters of an hour. The reaction mixture was then acidified with a mixture of 1.4 parts of monochloro acetic acid and 1 part of 50% lactic acid to a pH of about 4. This acidification is necessary in order to permit the water to be properly removed from the resin in vacuum at an elevated temperature. After the water has been distilled off, the yellowish viscous syrup may be stored without objection during a rather long period. It hardens in porcelain moulds in 48 hours at about 80° C.

In 90 parts of said resin 10 parts of maleic anhydride was introduced at a temperature of 40–80° C. The products were then well mixed, the mixture was poured into moulds and hardened at 60° C. The hardening time was about 1½–2 hours. The castings have a beautiful gloss, however, they are not completely transparent. The colour is light yellow and opalescent.

Example II

The resin produced according to Example I, after being completely dehydrated, is mixed with a mixture of equal parts of glycerol and maleic anhydride preheated to 130° C. Per 80 parts of the resin 20 parts of this mixture are added. After the mixture has become homogeneous, it is cast and hardened at 80° C.

In the following table the results are listed of measurements carried out on little plates cast from the resin according to this example.

| Percent maleic anhydride | Curing time in hours | Flexural strength kg./cm.² (Dynstat) | Impact strength kg. cm./cm.² (Dynstat) |
|---|---|---|---|
| 10 | 2.5 | 935 | 18 |
| 10 | 3.0 | 940 | 20 |
| 10 | 3.5 | 870 | 21 |
| 10 | 4.0 | 840 | 21 |

It follows, that a hardening time of 2½ hours should be used for this mixture.

The outward appearance of the products is somewhat opalescent, the gloss is particularly beautiful and the colour is light yellow. Machining on a lathe showed, that the machinability is very good.

I claim:

1. A process of producing a rapidly hardening cast resin which comprises reacting phenol and formaldehyde in an alkaline medium to form a reaction mixture, acidifying said reaction mixture to a pH of about 4, completely dehydrating said reaction mixture, mixing therewith a minor amount of maleic anhydride and heating the resultant mixture of phenol formaldehyde reaction product and maleic anhydride to form a cast resin.

2. A process of producing a rapidly hardening cast resin which comprises reacting phenol and formaldehyde in an alkaline medium to form a reaction mixture, acidifying said reaction mixture to a pH of about 4, completely dehydrating said reaction mixture, mixing therewith about 10% of maleic anhydride and heating the resultant mixture of phenol formaldehyde reaction product and maleic anhydride to form a cast resin.

3. A process of producing a rapidly hardening cast resin which comprises reacting phenol and formaldehyde in an alkaline medium to form a reaction mixture, acidifying said reaction mixture to a pH of about 4, completely dehydrating said reaction mixture, mixing therewith a minor amount of a mixture of glycerol and maleic anhydride and heating the resultant mixture of phenol formaldehyde reaction product, maleic anhydride, and glycerol to form a cast resin.

4. A process of producing a rapidly hardening cast resin which comprises reacting phenol and formaldehyde in an alkaline medium to form a reaction mixture, acidifying said reaction mixture to a pH of about 4, completely dehydrating said reaction mixture, mixing therewith about 20% of a mixture in equal amounts of maleic anhydride and glycerol, and hardening the resultant mixture of phenol-formaldehyde reaction product, maleic anhydride and glycerol to form a cast resin.

5. A process of producing a rapidly hardening cast resin which comprises reacting phenol and formaldehyde in an alkaline medium to form a reaction mixture, acidifying said reaction mixture to a pH of about 4, completely dehydrating said reaction mixture, mixing therewith about 20% of a preheated mixture in equal amounts of maleic anhydride and glycerol, and hardening the resultant mixture of phenol-formaldehyde reaction product, maleic anhydride and glycerol to form a cast resin.

6. A process of producing tension free castings which comprises reacting phenol and formaldehyde in an alkaline medium to form a reaction mixture, acidifying said reaction mixture to a pH of about 4, completely dehydrating said reaction mixture, mixing therewith a minor amount of maleic anhydride, molding and hardening the resultant mixture of phenol-formaldehyde reaction product and maleic anhydride to form tension free castings.

7. A rapidly hardening cast resin consisting essentially of the resin made by completely dehydrating a phenol-formaldehyde reaction product having a pH value of about 4, said resin having admixed therewith minor amounts of maleic anhydride.

8. A rapidly hardening cast resin consisting essentially of the resin made by completely dehydrating a phenol-formaldehyde reaction product having a pH value of about 4, said resin having admixed therewith about 10% maleic anhydride.

9. A rapidly hardening cast resin consisting essentially of the resin made by completely dehydrating a phenol-formaldehyde reaction product having a pH value of about 4, said resin having admixed therewith minor amounts of a mixture of maleic anhydride and glycerol.

10. A rapidly hardening cast resin consisting essentially of the resin made by completely dehydrating a phenol-formaldehyde reaction product having a pH value of about 4, said resin having admixed therewith about 20% of equal amounts of a mixture of maleic anhydride and glycerol.

11. A tension free casting consisting essentially of a molded and hardened mixture of the resin made by completely dehydrating a phenol-formaldehyde reaction product having a pH value of about 4, said resin having admixed therewith a minor amount of maleic anhydride.

12. A tension free casting consisting essentially of a molded and hardened mixture of the resin made by completely dehydrating a phenol-formaldehyde reaction product having a pH value of about 4, and having admixed thereto about 10% maleic anhydride.

13. A tension free casting consisting essentially of a molded and hardened mixture of the resin made by completely dehydrating a phenol-formaldehyde reaction product having a pH value of about 4, and having admixed thereto a minor amount of a mixture of maleic anhydride and glycerol.

14. A tension free casting consisting essentially of a molded and hardened mixture of the resin made by completely dehydrating a phenol-formaldehyde reaction product having a pH value of about 4, and having admixed thereto about 20% of equal amounts of a mixture of maleic anhydride and glycerol.

15. A process of producing tension free castings which comprises reacting phenol and formaldehyde in an alkaline medium to form a reaction mixture, acidifying said reaction mixture to a pH of about 4, completely dehydrating said reaction mixture, mixing therewith a minor amount of a mixture of glycerol and maleic anhydride, molding and hardening the resultant mixture of phenol-formaldehyde reaction product, maleic anhydride, and glycerol to form tension free castings.

WILLEM JOHAN TAAT.
RUDOLF WILLEM VAN
    HOESEN KORNDORFFER.

REFERENCES CITED

The following references are of record in the file of this patent:

UNITED STATES PATENTS

| Number | Name | Date |
|---|---|---|
| Re. 19,709 | Ostersetzer et al. | Sept. 17, 1935 |
| 1,720,052 | Norton | July 9, 1929 |
| 1,909,786 | Pantke | May 16, 1933 |
| 2,077,640 | Murdock et al. | Apr. 20, 1937 |
| 2,337,874 | D'Alelio | Dec. 28, 1943 |